Jan. 14, 1941.   W. C. DURFEE   2,228,872
BALANCE
Filed Aug. 30, 1938
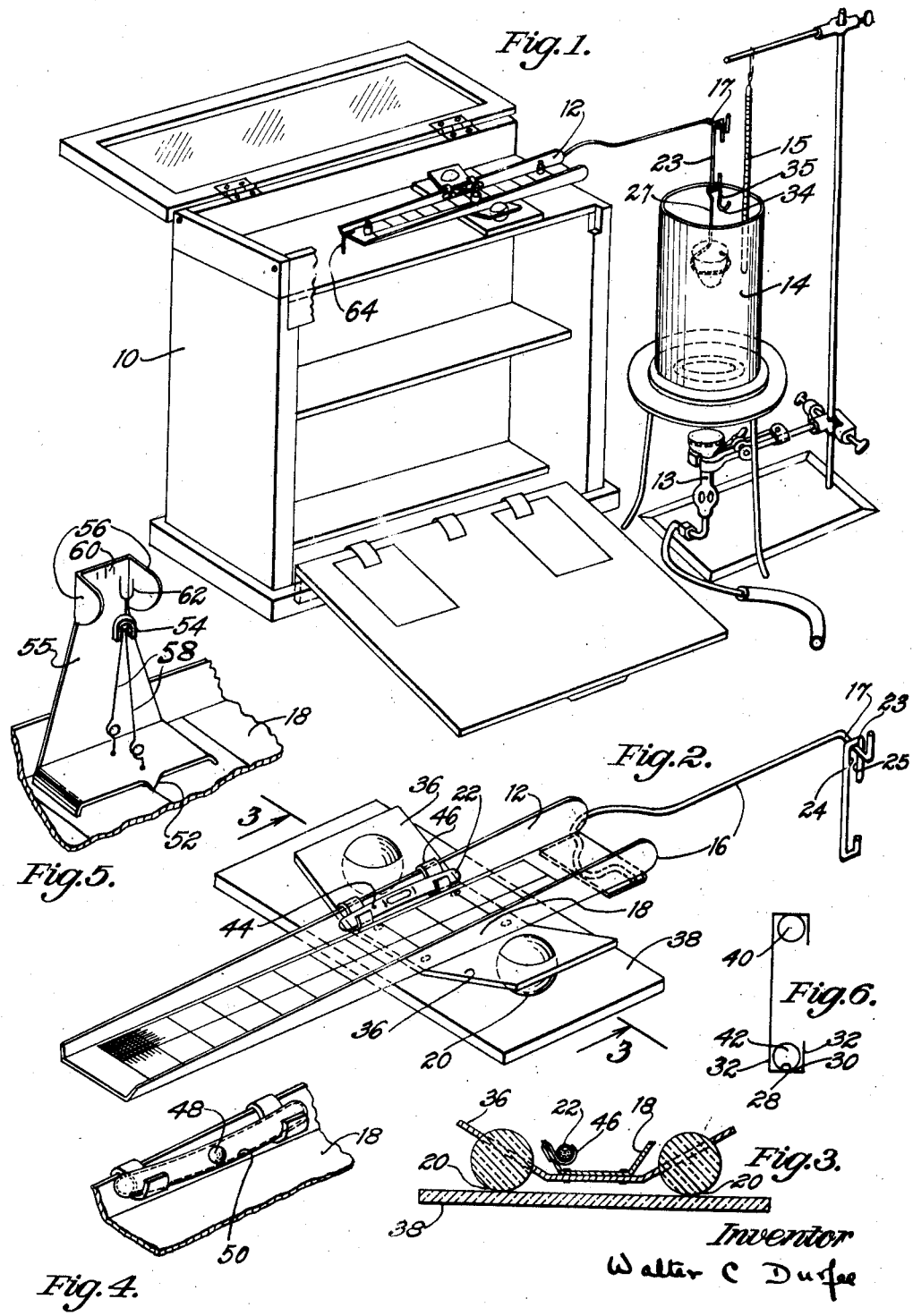
Inventor
Walter C Durfee Patented Jan. 14, 1941

2,228,872

UNITED STATES PATENT OFFICE 2,228,872

BALANCE

Walter C. Durfee, Jamaica Plain, Mass.

Application August 30, 1938, Serial No. 227,507

5 Claims. (Cl. 265—49)

This invention relates to sensitizing the indications of a balance arm, as in weighing and the like, especially at midswing.

My invention relates more particularly to a balance arm sensitized by a rocker type of support, especially freed of friction, and further sensitized in its swing by an oscillating or other sensitive type of indicator upon the balance arm. These and other features of the invention will be understood from the following description of an embodiment thereof, selected for illustration and shown in the accompanying drawing in which, Fig. 1 is a perspective view of my invention mounted over the edge of a suitable piece of shelf furniture in connection with an experiment requiring numerous instantaneous weighings, Fig. 2 is an enlarged perspective view of the balance, Fig. 3 is section on 3—3 of Fig. 2, Fig. 4 is fragmentary view, showing a modified form of indicator, Fig. 5 is fragmentary view showing a typical oscillating indicator as applied to react on the stability of the balance arm, Fig. 6 is an enlarged view of a detail.

In Fig. 1 of the drawing I have illustrated the invention arranged to observe losses of a few ten-thousandths of an ounce whenever they occur and wherein weights have been prearranged to detect such losses when they occur.

The equipment illustrated in Fig. 1 incidentally comprises a cabinet 10 particularly adapted to house the balance 12 and other balance room equipment, the balance being adapted to rest on a shelf of such furniture. I also illustrate other pertinent equipment with the balance to the use of which it is adaptable and including a burner 13 a flue 14 and a thermometer 15.

The first step of construction of my invention is to obtain a frictionless hanger hook on a balance arm 16 suitable for rough usage, and I preferably therefore select the rounded bearing surfaces shown at 40 in Fig. 6 in the hanger support 17, which is transverse of the beam 18, and I select the rounded bearing surfaces of the beam rockers 20 appropriately spaced as shown. I select a simple type of balance, preferably of the steel yard type, to avoid surplus and frictional parts such as from guide links: operated in usual horizontal manner to avoid intricate complications.

The second step of construction is to utilize such small motions as the small weight discrepancies to be measured can produce in a short time. I provide therefore, to detect any deviations of the balance arm position, a sensitive inclinometer 22 which is advantageously a spirit level, and I improve the utility of such inclinometers in relation to my purpose. I furthermore improve the utility of the rounded hanger support aforesaid, by placing a flat-top hook 23 such as is customary on knife edge supports on the rounded hanger support 17 and adding thereto near the top of the hook a close arrangement of the steep hook sides 24 and 25 to nearly approach the said hanger support.

It will be observed that the hook is likely to sway in operation and the arm 16 will tilt and the rounded surface of the hanger support 17, further represented at Fig. 6 will travel from side to side of the hook top by a very small amount of rolling travel as the hook sways or the arm tilts and thereafter it will become approximately centered by crowding against and being pushed by the nearly adjacent steep sides 24 and 25 of the hook so as to eventually be rolling free from them in a position of mid swing.

I hang a combined weight and load hanger 27 on a lower part of the hook 23 preferably by a construction similar to the top of the hook, inverted upside down.

It will be observed that a possible stiffness between the hook and hanger due to a false location of these parts is likely to be remedied by accidental motion of the hanger and can be remedied by intentionally flexing the hook by moving the lower end of it to cause a little rolling of the round 28 on the flat 30 to push aside the sides 32 of the hook, and so make the hook substantially free, relative to the hanger 27. Incidentally it is useful to have a weight receiver 34 on the hanger for occasional compensating weights as in weighing by substitution, and I illustrate a hook 35 suitable for S weights to hang upon as an example of weight receivers.

My balance arm is strengthened at 36 to carry the rockers 20 on the flat plate 38. The flat plate 38 is preferably truly flat and may well be of glass, for example, mirror glass so that all parts will be alike and it will make little difference if the rockers rest upon it at one spot or at another. I show spheres for rockers to provide spare points of support as replacements in case of damage. The rockers should be firm in their embracements and the plate firm on its shelf.

Figure 3 shows large rockers with a center of curvature on line 3—3 to enable the beam to be bottom heavy as the beam will act substantially as if pivoted on 3—3 with the addition of a slight travel to and fro.

Smaller curves like 20 can well be used if the plate 38 is built up to meet the curves, or cut away for beam 18. By mounting the plate at a slight slope, longitudinally of the beam, the points of support at 20 will be adjusted to a new longitudinal position and the effective leverage of the balance arm will be adjusted thereby.

When the link hook 23 is in adjustment, as said, the flat top of it will be level and it will rest, therefore, accurately directly over the center of the rounded curve of the hanger support with an astonishing degree of accuracy, within a precision that is open to calculation from the clearances of 40 and 42 at the hook ends and from the length of the hook, which items limit the error as the hook is long and as the clearance is small. The radial center of curvature of the support 40 is effectively the center of support of the hanger. I prefer sufficient clearance to permit a reasonable free swing without wearing away the parts by continual self adjustments which slightly rub the parts.

In use of the balance I find it convenient to have on the balance arm a graduated weight deck (not receptive to humidity). Such a swinging balance arm as I have described is a good indicator of its own position if there is a reference point to compare it. It can be made better however by mounting a spirit level 44 longitudinally of the beam and putting a reference mark on the level. I have found by doing this that a level of the common bent tube type 44 containing liquid will indicate still better when the bend of the tube is less upward. I therefore provide holders 46 to mount the tube of the level and to adjustably position it by rotation into positions approaching downward a sidewise horizontal disposition of the bend, thus lowering the up-bend. The sensitivity of the level to tilting of the beam can thus be substantially varied to suit the requirements.

I find further that the fluctuation of location of liquid in the level tube tends to aid the balance arm to tilt over so that the balance may be bottom heavy and quick moving, on the whole, and yet the fluctuation of liquid in the bubble tube will destroy to any desired extent such bottom heaviness and make the balance more sensitive by helping it to tilt over and, if I so desire, top heavy during the operation of the level indicator. This is during the part of the swing of the balance arm that is being indicated and not during the part of the swing when the liquid of the indicator has fluctuated over to one end of the tube or to the other. I therefore sensitize a desirable portion of the swing of the balance arm to a desirable extent by rotatably adjusting the spirit level tube in its holder as explained in regard to sensitizing the indications, and also by selecting tubes of appropriate liquid weight and motion and of appropriate length and suitable curvature.

The utility of this means of adjustment of sensitivity is very great and of endless variety and it will be observed that a feature of adjustment is that stops are provided to the range of sensitized motion, in this case, by the ends of the indicator tube and in cases to be mentioned by corresponding stops to the fluctuations of equivalent indicating means that is mounted for operation by the balance arm. The principle of action is best seen by constructing a number of equivalent devices. The almost limitless sensitivity of the bearings can be adequately utilized and made effective, as desired, by means of the adjustment of the level tube: and the usual wide and tediously slow oscillations of sensitive balances are avoided; thereby creating a new class of balance. An almost limitless sensitivity of the balance can be adequately utilized and made effective, as desired, by means of the adjustment of the level tube, and the usual wide and tediously slow oscillations of sensitive balances avoided, thereby creating a new class of balance.

An equivalent indicating device resembling a spirit level (Fig. 4) may be made wherein a ball 48 of suitable size is in oscillating equilibrium by rolling on a course 50 suitably low at a mid part of the run and of limited length. The fluctuations of stationary equilibrium positions of the ball correspond to the inclinations of the course 50. The weight and the travel of the ball between different positions, correspond to a leverage per degree of inclination that neutralizes to a corresponding extent the bottom heaviness of the balance on which the oscillating indicator is mounted. The shape of the lowering at the midcourse modulates the amount of these effects at that part of the run. The ends of the course stop the actions of the indicator to within the range desired to be sensitized.

I have designed a very useful example (Fig. 5) in part similar to an element of U. S. Patent No. 2,113,255 and here amplified to illustrate more fully the principles that I have found useful in sensitizing and on this embodiment (Fig. 5) I have placed a pointer 52 so that it can also be used as a rider weight. A mass 54 is provided in oscillating equilibrium and is mounted on the standing springs 58 which rise from the base of the mounting 55, appropriately to be tilted in unison with the balance arm so as to have positions of rest which fluctuate with respect to the mounting 55 according to changes of inclination of the mounting. I provide stops 56 to limit the action within a desired range. A chart 60 on the mounting gives a reference point to judge the action, and it is not necessary to have some separated reference piece whereby to judge the action of the balance arm.

The principle of sensitizing the balance by regulation of the indicators as before mentioned can be clearly understood by the present example and compared to usual practice. Balances often have a vertical post fixed to the beam perpendicular to the beam upwardly on which an adjustment weight is set suitably high or low and the purpose of this is to sensitize the balance; because if the weight of the balance beam, in tilting, shifts to the one side of the fulcrum of the balance and thereby counteracts the tilting then the weight on the post at the same time travels by an opposite shift and usually to the other side of the fulcrum, and the one shift offsets the other and the tilting is not counteracted so much and is more sensitive. This is well known but mentioned for the purpose of thereby pointing to the corresponding parts in the class of indicators cited. In each indicator a part of some considerable weight shifts position when tilted and the shift is regulated by means provided. In addition and to great advantage this sensitizing is naturally at the midswing where it is desired to observe the balance and use it, and the customary slow action of sensitive balances occurs only in the one part of the swinging because the indicator has some motion stop, as at 56, and the ends of 22 and 50.

It is possible to easily understand from Fig. 5 that various oscillating indicators can be mounted more or less transverse to the balance arm to adjustably reduce their longitudinal effects which can be so diminished even to zero. From the examples given it can be observed that a movable mass shifts during the action of each indicator as in the cases of weight 54, ball 48, and the liquid at 22. In the case of the tubes 50, Fig. 4, and 44, Fig. 2, such a shift of weight affects the stability of the balance and this will obviously be regulated by a rotation of these bent tubes in their holders. A shifting mass 54, Fig. 5, is likewise shown to illustrate a further mode of regulation by a more or less transverse position of mounting; and to further illustrate the meaning of motion stops 56, whereby the effect of an indicator mass on the stability of the balance is confined to the midswing of the balance.

In Figs. 1 and 2 the arm 16 is shown in a slender form from which the rounded transverse hanger support 17 is readily formed by means of a suitable bend of the arm 16. For purposes of accurate weighing, such an arm obviously should be reasonably stiff so that the load on the hanger will not severely bend it. In addition such bending as actually does occur should not change the leverage of the balance arm appreciably. The arm will bend to be short, if its flexible portions are high; and will bend to be long, if these portions are low. Therefore the flexible portions of such an arm should be especially shaped so that any portions which are necessarily low or high will be compensated by other portions having an opposite character. This can be accomplished by trial and observation of results, or by calculation.

A retainer 64 for the beam will be useful when heavy counterpoises are to be lifted.

It should be understood that the several parts of the balance may be altered to suit other purposes, individually, and occasionally eliminated and supplemented and modified according to the purpose.

Having thus described my invention what I claim as new and desire to secure by Letters Patent of the United States is,

1. A balance comprising a beam mounted to tilt on a transverse axis, a spirit level mounted on the beam transversely of said axis, the spirit level being of arcuate shape from end to end, and means mounting the level for transverse rotary adjustment on the beam whereby to vary the sensitivity of the level to tilting of the beam whereby varying the surge of the moving indicator mass and thereby varying the stability of the balance.

2. A balance comprising a support having a plane surface, two rockers adapted to rest on said plane surface, the rockers being in spaced relation and the portions thereof adapted to engage said surface being curved in all vertical planes passing through said portions, a bridge connecting and supported by the rockers, and a scale beam on and extending transversely of the bridge.

3. The balance defined in claim 2 in which said rockers are spheres.

4. The balance defined in claim 2 plus an arm round in the upper part of its cross section carried by and horizontally transverse of one end of the beam, and a hanger having a hook engaged over the arm, the hook gap being wider than the diameter of the arm and including a horizontal portion in contact with the arm, whereby the arm is engaged only on a horizontal portion of its rounded cross section.

5. The balance defined in claim 2 plus an arcuately shaped spirit level mounted on the beam longitudinally of the beam, and means mounting the level for rotary adjustment on the beam whereby the sensitivity of the balance to tilting on said surface can be varied.

WALTER C. DURFEE.